(12) United States Patent
Sandahl et al.

(10) Patent No.: US 6,588,779 B2
(45) Date of Patent: Jul. 8, 2003

(54) VEHICLE WHEEL SUSPENSION ARRANGEMENT

(75) Inventors: Anders Sandahl, Torslanda (SE); Sigvard Zetterström, Hakenaset (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/682,875

(22) Filed: Oct. 26, 2001

(65) Prior Publication Data

US 2002/0043780 A1 Apr. 18, 2002

Related U.S. Application Data

(63) Continuation of application No. PCT/SE00/00402, filed on Mar. 1, 2000.

(51) Int. Cl.$^7$ ................................................ B60G 3/18
(52) U.S. Cl. ............................................. 280/124.135
(58) Field of Search .................. 280/124.135, 124.134, 280/124.145, 124.152, 124.136, 124.139, 124.163, 93.51, 93.512, 86.75, 86.758

(56) References Cited

U.S. PATENT DOCUMENTS

| | | |
|---|---|---|
| 4,813,704 A | 3/1989 | Smith |
| 4,828,279 A | 5/1989 | Matschinsky |
| 4,964,651 A * | 10/1990 | Kubo ................... 280/124.109 |
| 5,851,016 A * | 12/1998 | Kawagoe et al. ...... 280/124.135 |
| 5,938,219 A * | 8/1999 | Hayami et al. ....... 280/124.135 |

FOREIGN PATENT DOCUMENTS

| | | |
|---|---|---|
| DE | 4224484 A1 | 1/1994 |
| EP | 0857590 A1 | 8/1998 |
| FR | 763596 A | 5/1934 |

* cited by examiner

*Primary Examiner*—Paul N. Dickson
*Assistant Examiner*—Faye M. Fleming
(74) *Attorney, Agent, or Firm*—Howrey Simon Arnold & White LLP

(57) ABSTRACT

An arrangement for the suspension of a motor vehicle wheel having a wheel-bearing housing for bearing the wheel, a lower link arm for connecting the bodywork of the motor vehicle and a lower part of the wheel-bearing housing, and an upper link arm for connecting the bodywork and an upper part of the wheel-bearing housing. The arrangement further includes an additional connection between the bodywork and the wheel-bearing housing and a coupling link that is substantially rigid in the vertical direction for connecting the additional connection and lower link arm. The improved arrangement is especially suitable for a rear wheel suspension in a motor vehicle, thereby permitting a high degree of longitudinal softness and high windup strength.

26 Claims, 2 Drawing Sheets

VEHICLE WHEEL SUSPENSION ARRANGEMENT

CROSS REFERENCE TO RELATED APPLICATIONS

The present application is a continuation patent application of International Application No. PCT/SE00/00402, filed Mar. 1, 2000, which was published in English pursuant to Article 21(2) of the Patent Cooperation Treaty, and which claims priority to Swedish Application No. 9901476-3, filed Apr. 26, 1999.

BACKGROUND OF INVENTION

1. Technical Field

The present invention relates to a vehicle wheel suspension arrangement. More particularly, the invention is related to an independent rear wheel suspension for a driven or non-driven rear wheel of a motor vehicle.

2. Background Information

In vehicles such as passenger cars, various types of suspension systems can be used for the vehicle wheels. These wheel suspensions are designed in a known manner that permits attachment and spring suspension of all the wheels of the vehicle, thereby improving both the comfort of the passengers in the vehicle and the vehicle's road-handling properties, while increasing the service life of the vehicle. A number of different types of wheel suspensions are already known and included in systems such as rigid or independent wheel axles. If required, these wheel suspensions can be supplemented with spring elements, shock absorbers and other components. Additionally, link arms are often used to take up forces and connect the vehicle's wheels to its bodywork. Further, stabilizers may also be used to reduce excessive pitching movements of the vehicle.

A conventional rigid rear axle wheel suspension is a robust and effective construction that also maintains a constant track width (i.e., a constant distance between those points where the opposing side rear wheels are in contact with the road surface). However, the rigid rear axle tends to transmit, at least to some extent, the movements of the wheel(s) of one side to the wheel(s) of the other side. For this reason, an independent rear wheel suspension is often used. The independent rear suspension is designed so that the wheels are able to spring independently of each other, which is advantageous with regard to the comfort of the ride. Further, in an independent rear wheel suspension, various link elements are used to maintain the desired track width, camber angle and toe-in angle of each wheel. An independent rear wheel suspension also permits less unsprung weight while providing more space for, for example, the gasoline tank and trunk.

An independent rear wheel suspension can be constructed such that it provides a certain degree of softness in the longitudinal direction of the vehicle, ire., force-absorbing characteristics in the longitudinal direction. This, in turn, can be used to satisfy the comfort of the passengers in the vehicle. The rear wheel suspension can also be constructed with a high "windup" strength, i.e., it counters the tendency of the wheel-bearing housing to twist during braking of the vehicle.

U.S. Pat. No. 4,828,279 ("the "279 patent") discloses an independent rear wheel suspension for a motor vehicle. The rear wheel suspension according of the "279 patent includes a lower link arm and an upper link arm. Together, both arms connect a wheel-bearing housing to a vehicle bodywork. The wheel-bearing housing is also elastically connected to the lower link arm via a further link element. By doing so, the wheel suspension has an effective force absorption and takes up little space.

Still, the above mentioned arrangement and other similar systems have difficulty in achieving at the same time both a high degree of longitudinal softness and a high windup strength. Further, with know rear wheel suspensions it is difficult to obtain a wheel suspension that reliably maintains a predetermined toe-in angle of the wheel in question, even under the effect of force, for example, upon sharp braking of the vehicle.

Accordingly, there is a need for a vehicle wheel suspension arrangement that is able to achieve both a high degree of longitudinal softness and a high windup strength. Further, there is a need for a vehicle wheel suspension arrangement that reliably maintains a predetermined toe-in angle of the wheel in question, even under the effect of force.

SUMMARY OF INVENTION

The object of the present invention is to provide an improved rear wheel suspension arrangement in a motor vehicle. In particular, the arrangement permits a high degree of longitudinal softness and high windup strength. This object is achieved by means of an arrangement having a wheel-bearing housing, a lower link arm able to connect the bodywork of the motor vehicle and a lower part of the wheel-bearing housing, and an upper link arm able to connect between the vehicle bodywork and an upper part of the wheel-bearing housing. The invention additionally includes a further connection between the vehicle bodywork and the wheel-bearing housing, and a coupling link that is substantially rigid in the vertical connection and able to connect the further connection and the lower link arm.

The invention affords a number of advantages compared to conventional systems for independent rear wheel suspensions. First, the invention satisfies the requirements for high longitudinal softness and windup strength, thereby providing a high degree of comfort for the passengers in the vehicle while effectively counteracting torsion of the wheel-bearing housing during braking. In addition, the further connection ensures that a correct toe-in angle for the wheel can be defined and maintained. This can be accomplished in one embodiment wherein the further connection is a bar that is dimensioned and arranged so that the predetermined toe-in angle of the wheel is defined and maintained. The invention also permits compact packing.

According to a preferred embodiment of the invention, use is made of a spring element in the form of a leaf spring. This spring element is fixed in the lower link arm and is arranged extending substantially transverse to the longitudinal direction of the vehicle. The leaf spring thereby replaces a conventional helical spring. This leaf spring can additionally provide for stabilization, thereby replacing a conventional stabilizer.

In another embodiment, the lower link arm may be substantially H-shaped and have at least four attachment points. Two of the attachment points can be connected to the vehicle bodywork, another attachment point can be connected to the wheel-bearing housing, and another attachment point can be connected to the coupling link. The further connection may be arranged so that it extends under the lower link arm along an imaginary line between one of the attachment point connected to the vehicle bodywork and the attachment point connected to the coupling link.

In other embodiments, the coupling link can have a substantially vertical extent. The above arrangement can also include a leaf spring that extends substantially transverse to the longitudinal direction of the vehicle. The leaf spring may be fixed in the lower link arm. The leaf spring can be designed with stabilizing properties.

The above arrangement may also include a shock absorber that can be secured between the vehicle bodywork and a point on the underside of the lower link arm. The arrangement can be such that the shock absorber runs freely through a hole in the lower link arm.

The wheel suspension arrangement described can be designed with a predetermined rearward inclination in relation to a vertical plane through the center of the wheel. In doing so, the tendency for the rear portion of the bodywork to lift and drop can be canceled out upon braking and acceleration of the vehicle.

BRIEF DESCRIPTION OF DRAWINGS

The invention will be explained in greater detail below with reference to a preferred illustrative embodiment and to the attached drawings, in which.

DETAILED DESCRIPTION

Figure 1:
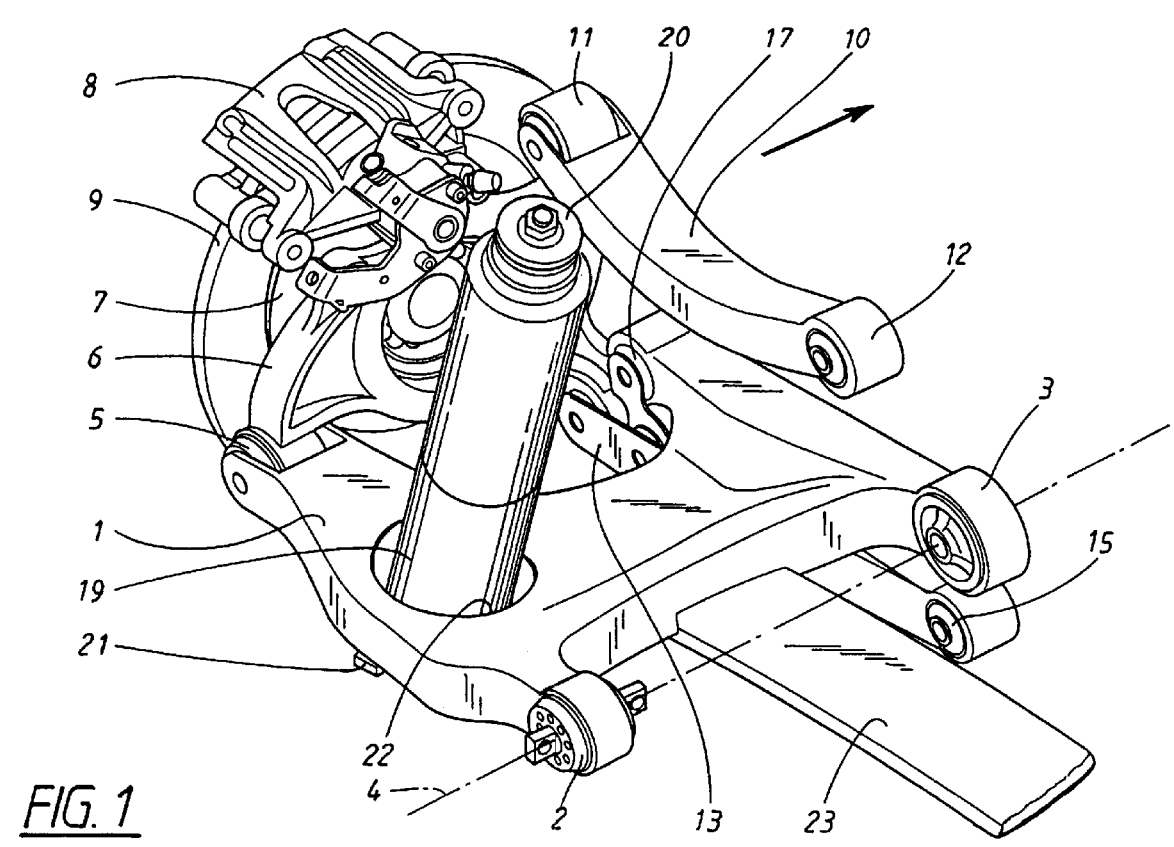
FIG. 1 illustrates a perspective view of one embodiment of an arrangement according to the present invention as seen obliquely from the rear.

A perspective view of an arrangement according to the present invention is shown in FIG. 1. According to a preferred embodiment, the arrangement is used on a rear wheel (not shown) of a motor vehicle. Preferably, but not exclusively, the vehicle is a passenger car. FIG. 1 shows the invention from an oblique rear view of the vehicle, i.e., as seen from the rear of the vehicle in question.

As shown in FIG. 1, one embodiment of the wheel suspension includes, as seen from above, a lower link arm 1. The illustrated lower link arm 1 is substantially H-shaped and designed with four attachment points. One or more attachment points 2, 3 are arranged on the vehicle's bodywork (not shown). These bodywork attachment points 2, 3 preferably include rubber bushings, thereby permitting a certain degree of movement of the lower link arm 1 relative to the bodywork. It should be noted that the attachment points of the present invention are not limited to the rubber bushing type. For example, the attachment points can alternatively include ball joints or similar attachment elements. An imaginary coaxial axis 4 runs through each attachment element, and is defined with the aid of the bodywork attachment points 2, 3. This axis 4 thus defines a pivot axis for the movement of the lower link arm 1 upon spring deflection. In addition, the axis 4 is preferably arranged so as to extend substantially parallel to the longitudinal direction of the vehicle in question.

The lower link arm 1 may also include one or more housing attachment points 5 that are fixed on a wheel-bearing housing 6, which in turn supports a hub 7 in which the wheel in question can be rotatably secured. The wheel-bearing housing 6 also supports a disc brake arrangement 8 such as is known per se that includes brake linings (not shown) designed to be applied to a brake disc 9 connected to the hub 7. In this way, the wheel in question can be braked.

The longitudinal direction of the vehicle is indicated in FIG. 1 by an arrow that is pointing towards the front of the vehicle. An upper link arm 10 is arranged on that side of the wheel which faces forward. This upper link arm 10 primarily takes up forces in the transverse direction of the vehicle. Together with the lower link arm 1, the upper link arm 10 defines the camber angle of the wheel, i.e., the angle of inclination of the wheel in relation to an imaginary plane which runs along the vehicle at right angles to the underlying road surface. The upper link arm 10 also extends substantially at right angles to the longitudinal direction of the vehicle and is fixed in the wheel-bearing housing 6 via at least one upper link housing attachment point 11. More precisely, this attachment point 11 is arranged on the wheel-bearing housing 6 at a position which is situated above the center point of the wheel. In addition, the upper link arm 10 is fixed in the bodywork via at least one upper link bodywork attachment point 12. Both attachment points 11, 12 in the upper link arm 10 preferably include rubber bushings. However, they can alternatively include ball joints, for example.

The upper link bodywork attachment point 12 is preferably placed outside the bodywork attachments 2, 3 of the lower link arm 1. The upper link bodywork attachment point 12 is also preferably oriented essentially along the same extent as the axis 4.

In the illustrated embodiment, the upper link arm 10 is designed with a slight curvature. In this way, it can fit under a side beam (not shown) running in the longitudinal direction of the vehicle.

Figure 2:
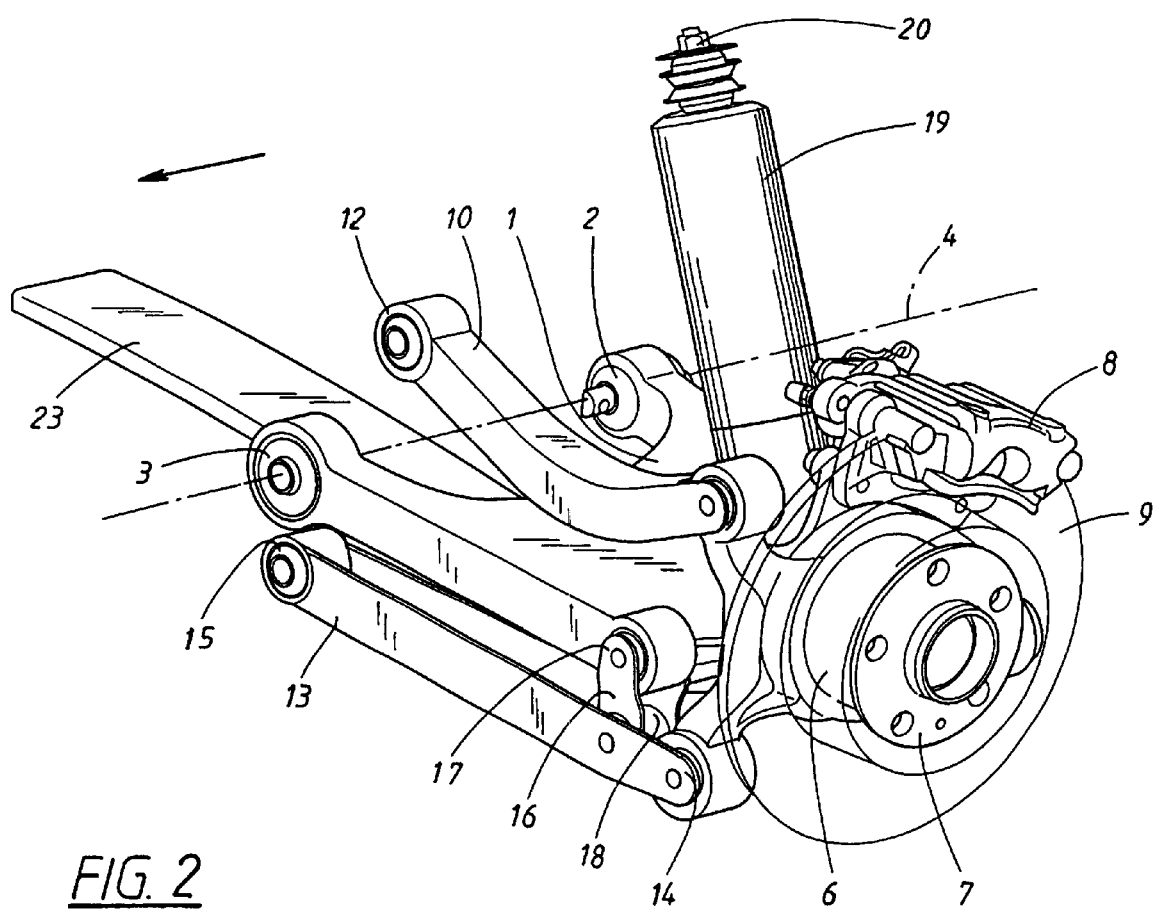
FIG. 2 illustrates a perspective view of one embodiment of an arrangement according to the invention as seen obliquely from the front.

As can be seen particularly clearly from FIG. 2, the wheel suspension according to the invention includes one or more further link elements 13 in the form of a bar, which preferably is fixed as a connection between the bodywork and the wheel-bearing housing 6. More precisely, the further link 13 extends substantially in the transverse direction of the vehicle between the lower part of the wheel-bearing housing 6 and the vehicle bodywork. The coupling to the wheel-bearing housing 6 is made via at least one further link housing attachment point 14, which is preferably situated below a horizontal plane extending through the center point of the wheel. The coupling to the bodywork is via at least one further link bodywork attachment point 15. According to the embodiment, the further link, or bar 13, is arranged extending below the lower link arm 1. Like the other attachments in the invention, the attachments 14, 15 of the bar 13 preferably comprise rubber bushings. The bar 13 is preferably made up of two elongate plates of steel or corresponding material, between the end parts of which the attachments 14, 15 are arranged.

The bar 13 is connected to the lower link arm 1 via a further link element in the form of a coupling link 16. The coupling link 16 preferably comprises two elongate plates made of steel or similar material. As can be seen from FIG. 2, the coupling link 16 is preferably arranged so that it forms a right angle to the plane of the lower link arm 1. The coupling link 16 can be coupled to the lower link arm 1 and bar 13 via further coupling attachments 17, 18, respectively, which preferably comprise rubber bushings. The attachments 17, 18 can alternatively comprise a ball joint, a rubber pad or the like. The coupling link 16 provides a coupling that is substantially fixed in the vertical direction between the lower link arm 1 and the bar 13. By doing so, force can be taken up in an substantially vertical direction from the wheel-bearing housing 6 via the bar 13 and the coupling link 16, and then onward to the lower link arm 1.

The bar 13 is preferably designed and fixed in such a way that it defines a specific distance between the wheel-bearing housing 6 and the bodywork. This ensures that the wheel is given a correct toe-in angle, i.e., a predetermined angle between the longitudinal axis of the vehicle and an imaginary plane along the wheel. With the aid of the bar 13, it is possible to ensure that the wheel at all times maintains this toe-in angle, especially with respect to the longitudinal suspension upon braking and/or collision. In other words, the tendency for the wheel to toe out in certain situations, such as upon sharp braking, is effectively counteracted by means of the bar 13. For this purpose, the bar 13 preferably extends in such a way as to form an angle of about 90° in relation to the longitudinal direction of the vehicle.

The bar 13 further is able to take up torque via the coupling 16 to the lower link arm 1. For example, forces that arise upon braking are transmitted to the bodywork via the lower link arm 1 and the bar 13. With the arrangement of these components according to the invention, a high windup strength is achieved, i.e., the tendency of the wheel-bearing housing to twist during braking can be counteracted. Moreover, the longitudinal forces of the wheel can be taken up by the outer attachment 15 of the lower link arm 1 to the wheel-bearing housing 6. The front bodywork attachment point 3 of the lower link arm 1, preferably includes a relatively large and radially soft bushing, giving the wheel the desired longitudinal softness.

Generally speaking, the lower link arm 1 takes up longitudinal forces, while the bar 13 together with the lower link arm 1 takes up forces in the transverse direction. According to the invention, the lower link arm 1 is designed and fixed with a high degree of torsional strength that is communicated to the wheel-bearing housing substantially without forces arising in the horizontal plane. As forces are transmitted from the bar 13 to the lower link arm 1 via the coupling link 16, a shearing movement is permitted between the bar 13 and the lower link arm 1.

The coupling link 16 is preferably positioned as far out on the bar 13 as possible, i.e., as close as possible to the wheel-bearing housing 6. By doing so, the bending forces acting on the bar 13 are minimized.

In summary, the arrangement according to the invention provides a wheel suspension that is soft in the longitudinal direction but still with windup strength. These are extremely advantageous properties in a rear wheel suspension of a vehicle such as a passenger car.

The wheel suspension according to the invention moreover includes a shock absorber 19 of substantially conventional type. The shock absorber is fixed in the bodywork via at least one shock bodywork attachment point 20, and in the lower link arm 1 via a shock lower link attachment point 21 (the shock lower link attachment point 21 can be partially seen in FIG. 1). The shock lower link attachment point 21 is preferably arranged on the underside of the lower link arm 1. Accordingly, the shock absorber 19 is arranged so that it runs through a through-hole 22 in the lower link arm 1 as seen in FIG. 1. Fixing the shock absorber 19 on the underside of the lower link arm is advantageous, for example, with respect to the packing of the shock absorber 19.

The arrangement according to the invention may also include a spring element 23, here illustrated in the form of a leaf spring 23. The spring element 23 is arranged extending substantially transverse to the longitudinal direction of the vehicle and is fixed with its end part in the lower link arm 1. Using a leaf spring 23 has advantages, such as reduced weight and reduced space requirements in the vehicle. Moreover, the leaf spring 23 replaces a conventional stabilizer, i.e., according to the invention the leaf spring 23 is given a stabilizing function.

The whole arrangement according to the invention preferably slopes slightly towards the rear, i.e., in relation to a vertical plane through the center of the wheel. This gives the vehicle an effective anti-lift and. anti-squat function, i.e., the tendency of the vehicle body to lift at the back during braking and to drop upon acceleration can be effectively counteracted.

The invention is not limited to the embodiment described above and can be varied within the scope of the attached patent claims. For example, the invention can be used in different types of vehicles, e.g. passenger cars, lorries and buses. In addition, the invention can be applied both to driven and non-driven wheels. The invention can be used both in two-wheel drive and four-wheel drive. Regarding the choice of material, the two link arms 1, 10 can be made of steel, aluminum or similar suitable material. As an alternative to the leaf spring 23 described above, other springs can also be used. For example, a conventional helical spring made of steel can be used for this purpose.

In various embodiments the bar 13 can be positioned extending under the lower link arm 1, as can be seen in the figures, or can alternatively be arranged extending above the lower link arm 1. Moreover, the bar 13 can alternatively be placed on that side of the wheel-bearing housing 6 which faces towards the rear of the vehicle. The bar 13 is preferably arranged extending below an imaginary horizontal plane which runs through the center of the wheel. However, it should be understood that the invention is not limited to this design and can be arranged above such a plane.

As an alternative to what has been described above, the coupling link 16 can be arranged so that it constitutes a connection between the lower link arm 1 and the upper link arm 10. In this way, the lower link arm 1 can communicate its torsional strength to the wheel-bearing housing 6 via the upper link arm 10.

Finally, it should be noted that the arrangement according to the invention can be fixed on a bodywork (as has been described above) or alternatively to a so-called sub-frame, i.e., a separate attachment component by means of which a complete rear wheel suspension can be effectively mounted.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A vehicle wheel suspension arrangement, the arrangement comprising:

a wheel-bearing housing for bearing the wheel, a lower link arm able to connect the vehicle bodywork and a lower part of the wheel-bearing housing, an upper link arm able to connect the vehicle bodywork and an upper part of the wheel-bearing housing, a further connection between the vehicle bodywork and the wheel-bearing housing, the further connection being arranged extending under the lower link arm and extending substantially along an imaginary line between at least one bodywork attachment point and at least one coupling attachment point, and a coupling link between the further connection and the lower link arm, the coupling link being substantially rigid in the vertical direction, the lower link arm further comprising one or more bodywork attachment points able to connect to the vehicle bodywork, one or more housing attachment points able to connect to the wheel-bearing housing, and one or more coupling attachment points able to connect to the coupling link.

2. The arrangement according to claim 1, the lower link arm being substantially H-shaped.

3. The arrangement according to claim 1 wherein the coupling link has a substantially vertical extent.

4. The arrangement according to claim 1, further comprising a spring element extending substantially transverse to the longitudinal direction of the vehicle and fixed in the lower link arm.

5. The arrangement according to claim 4, the spring element being designed with stabilizing properties.

6. The arrangement according to claim 1, further comprising a shock absorber secured between the bodywork and a point on the underside of the lower link arm, the shock absorber able to run freely through a hole in the lower link arm.

7. The arrangement according to claim 1, the arrangement being rearwardly inclined in relation to a vertical plane through the center of the wheel, thereby canceling out the tendency for the rear part of the bodywork to lift upon braking and drop upon acceleration of the vehicle.

8. The arrangement according to claim 1, the further connection comprising a bar dimensioned and arranged whereby a predetermined toe-in angle of the wheel is defined and maintained.

9. A vehicle wheel suspension arrangement, the arrangement comprising:
   a wheel-bearing housing for bearing the wheel,
   a lower link arm able to connect the vehicle bodywork and a lower part of the wheel-bearing housing,
   an upper link arm able to connect the vehicle bodywork and an upper part of the wheel-bearing housing,
   a further connection between the vehicle bodywork and the wheel-bearing housing,
   a coupling link between the further connection and the lower link arm, the coupling link being substantially rigid in the vertical direction, and
   a spring element extending substantially transverse to the longitudinal direction of the vehicle and fixed in the lower link arm.

10. The arrangement according to claim 9, the further connection comprising a bar dimensioned and arranged whereby a predetermined toe-in angle of the wheel is defined and maintained.

11. The arrangement according to claim 9, the lower link arm further comprising:
   one or more bodywork attachment points able to connect to the vehicle bodywork,
   one or more housing attachment points able to connect to the wheel-bearing housing, and
   one or more coupling attachment points able to connect to the coupling link.

12. The arrangement according to claim 11, the further connection being arranged extending under the lower link arm and extending substantially along an imaginary line between at least one bodywork attachment point and at least one coupling attachment point.

13. The arrangement according to claim 11, the lower link arm being substantially H-shaped.

14. The arrangement according to claim 9 wherein the coupling link has a substantially vertical extent.

15. The arrangement according to claim 9, the spring element being designed with stabilizing properties.

16. The arrangement according to claim 9, further comprising a shock absorber secured between the bodywork and a point on the underside of the lower link arm, the shock absorber able to run freely through a hole in the lower link arm.

17. The arrangement according to claim 9, the arrangement being rearwardly inclined in relation to a vertical plane through the center of the wheel, thereby canceling out the tendency for the rear part of the bodywork to lift upon braking and drop upon acceleration of the vehicle.

18. A vehicle wheel suspension arrangement, the arrangement comprising:
   a wheel-bearing housing for bearing the wheel,
   a lower link arm able to connect the vehicle bodywork and a lower part of the wheel-bearing housing,
   an upper link arm able to connect the vehicle bodywork and an upper part of the wheel-bearing housing,
   a further connection between the vehicle bodywork and the wheel-bearing housing,
   a coupling link between the further connection and the lower link arm, the coupling link being substantially rigid in the vertical direction, and
   a shock absorber secured between the bodywork and a point on the underside of the lower link arm, the shock absorber able to run freely through a hole in the lower link arm.

19. The arrangement according to claim 18, the further connection comprising a bar dimensioned and arranged whereby a predetermined toe-in angle of the wheel is defined and maintained.

20. The arrangement according to claim 18, the lower link arm further comprising:
   one or more bodywork attachment points able to connect to the vehicle bodywork,
   one or more housing attachment points able to connect to the wheel-bearing housing, and
   one or more coupling attachment points able to connect to the coupling link.

21. The arrangement according to claim 20, the further connection being arranged extending under the lower link arm and extending substantially along an imaginary line between at least one bodywork attachment point and at least one coupling attachment point.

22. The arrangement according to claim 20, the lower link arm being substantially H-shaped.

23. The arrangement according to claim 18 wherein the coupling link has a substantially vertical extent.

24. The arrangement according to claim 18, further comprising a spring element extending substantially transverse to the longitudinal direction of the vehicle and fixed in the lower link arm.

25. The arrangement according to claim 24, the spring element being designed with stabilizing properties.

26. The arrangement according to claim 18, the arrangement being rearwardly inclined in relation to a vertical plane through the center of the wheel, thereby canceling out the tendency for the rear part of the bodywork to lift upon braking and drop upon acceleration of the vehicle.

* * * * *

UNITED STATES PATENT AND TRADEMARK OFFICE
CERTIFICATE OF CORRECTION

PATENT NO. : 6,588,779 B2
DATED : July 8, 2003
INVENTOR(S) : Sandahl et al.

It is certified that error appears in the above-identified patent and that said Letters Patent is hereby corrected as shown below:

<u>Title page,</u>
Item [30], please add as follows:
-- [30]    Foreign Application Priorty Data
April 26, 1999 (SE) .................................. 9901476-3 --

Signed and Sealed this

Twenty-eighth Day of October, 2003

JAMES E. ROGAN
*Director of the United States Patent and Trademark Office*